United States Patent
Below

(10) Patent No.: US 6,986,372 B2
(45) Date of Patent: Jan. 17, 2006

(54) SERRATED GROOVE SIDES IN A TIRE

(75) Inventor: Todd Below, Texarkana, TX (US)

(73) Assignee: Cooper Tire & Rubber Company, Findlay, OH (US)

( * ) Notice: Subject to any disclaimer, the term of this patent is extended or adjusted under 35 U.S.C. 154(b) by 71 days.

(21) Appl. No.: 10/316,550

(22) Filed: Dec. 11, 2002

(65) Prior Publication Data
US 2003/0102064 A1    Jun. 5, 2003

Related U.S. Application Data

(63) Continuation of application No. 09/723,578, filed on Nov. 28, 2000, now abandoned.

(51) Int. Cl.
B60C 11/13     (2006.01)
B60C 107/00    (2006.01)

(52) U.S. Cl. ............................ 152/209.15; 152/209.21; 152/209.24; 152/902

(58) Field of Classification Search ........... 152/209.18, 152/209.21, 902, 209.15, 209.24
See application file for complete search history.

(56) References Cited

U.S. PATENT DOCUMENTS

| | | | |
|---|---|---|---|
| 2,604,920 A * | 7/1952 | Kirby | ...................... 152/209.18 |
| 2,843,172 A | 7/1958 | Berry et al. | |
| 5,031,680 A | 7/1991 | Kajikawa et al. | |
| 5,386,861 A | 2/1995 | Overhoff et al. | |
| 5,535,798 A | 7/1996 | Nakamura | |
| 5,647,926 A | 7/1997 | van der Meer et al. | |
| 5,964,267 A | 10/1999 | Poque et al. | |
| 6,079,464 A * | 6/2000 | Hatakenaka et al. | ... 152/209.24 |
| 6,250,354 B1 | 6/2001 | Kawai | |
| 6,415,835 B1 * | 7/2002 | Heinen | ................... 152/209.21 |

FOREIGN PATENT DOCUMENTS

| | | |
|---|---|---|
| EP | 393873 A2 | 10/1990 |
| GB | 460338 A | 1/1937 |
| JP | 50-98002 * | 6/1975 |
| JP | 58-177703 * | 10/1983 |
| JP | 1-223006 A | 9/1989 |
| JP | 4-274907 A | 9/1992 |
| JP | 9-136515 A | 5/1997 |
| JP | 11-78431 A | 3/1999 |

* cited by examiner

Primary Examiner—Steven D. Maki

(57) ABSTRACT

An improved tire tread has tread elements which form a tread pattern exhibiting two or more peripheral grooves and a plurality of transverse grooves extending inward from the outer (ground engaging) surface of the tread. Preferably the transverse grooves extend across the peripheral groves, and there are at least four of the peripheral grooves. Along at least a major portion of one upper side of chosen ones of such grooves, the tread elements defining such groove side are formed with serrations extending inward of the groove from the tread surface at an acute angle to a radius of the tire and terminating short of the base of the groove. The serrated surfaces define an upper portion of the groove as an opening of increased area at the upper part of the groove intersecting the tread surface, and present a substantially increased traction area along the outer or open top of the groove. In modifications of this tread, the serrations may be along one side of one or more of a plurality of peripheral tread grooves, or the serrations may be may be along opposite sides of such one or more grooves.

11 Claims, 4 Drawing Sheets

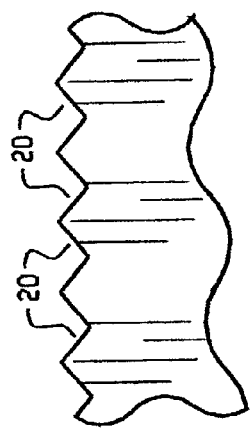
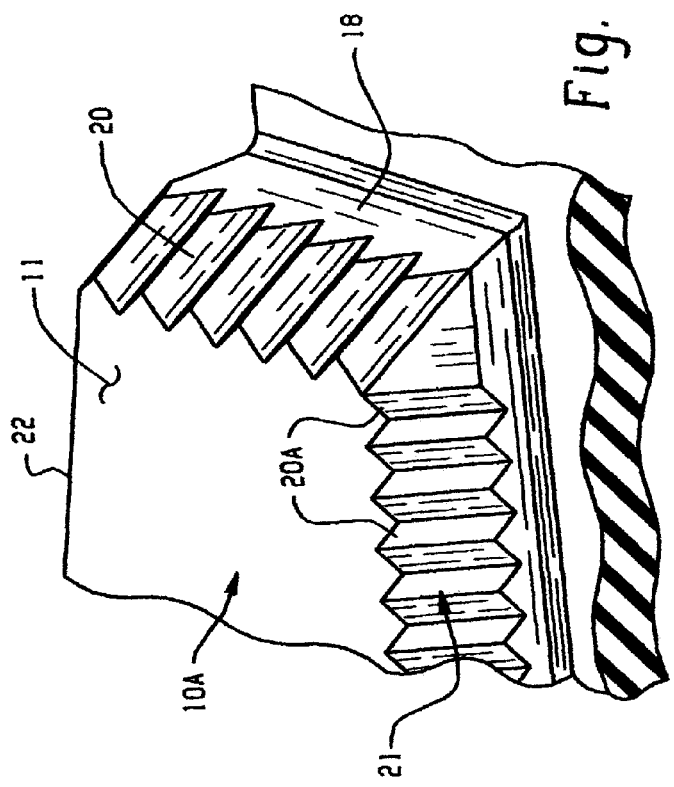
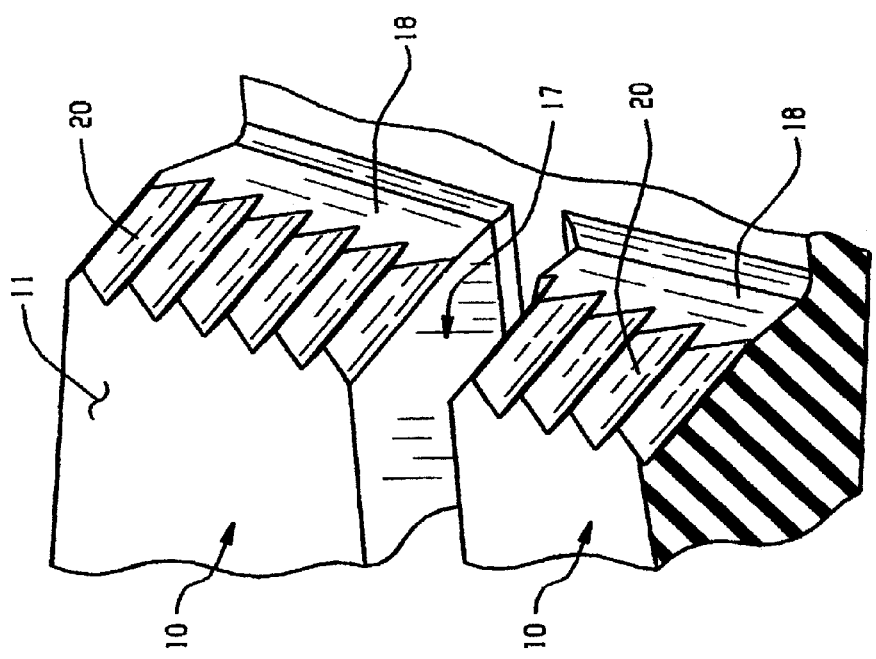

SERRATED GROOVE SIDES IN A TIRE

This application is a continuation of application Ser. No. 09/723,578 filed Nov. 28, 2000 abandoned.

BACKGROUND OF THE INVENTION

This invention relates to automotive tires, especially the tread thereof, which can provide improved traction, handling, and braking of a motor vehicle, and particularly to motor vehicle tires for light and medium truck service and passenger service.

BACKGROUND OF THE INVENTION

There is an ongoing need for vehicle tires having improved treads for use in driving in slippery conditions, such as over snow. Such treads can improve not only traction, but also handling characteristics and control, and braking of the vehicle.

While a number of grooved tire treads for use in this service are already known, none have been developed with a substantial increase in outward facing surface area of the groove or grooves defined by tire tread elements. For example, U.S. Pat. No. 5,647,926 discloses a "winter" tread having circumferentially spaced tread blocks offset from each other, each of which has a plurality of transverse sipes and similarly shaped transverse grooves which define the boundaries of the tread elements. Thus, the circumferential grooves of the tread are defined by repeatedly irregular walls. A number of prior art patents, typified by U.S. Pat. No. 5,535,798 and U.S. Pat. No. 2,843,172, show straight walled circumferential tread grooves with so-called reentrants formed on one or both walls and the bottom of the groove, which reentrants increase in width and depth toward the bottom of the groove. U.S. Pat. No. 5,386,861 discloses full depth projections 20 formed extending inward from the groove wall sides 10 of the tread blocks (FIG. 1), forming, in effect, a groove of decidedly irregular surface(s). The projections are at an even steeper angle with respect to the tread surface than are the groove sidewalls (FIG. 2). At least some of projections 20 also have additional saw-tooth-like sub-projections 32 (FIGS. 3 & 4).

SUMMARY OF THE INVENTION

The present invention is directed to an improved tire with a novel tread having tread elements which form a tread pattern exhibiting two or more peripheral grooves and/or a plurality of transverse grooves. The grooves are discontinuous in the sense that these grooves are defined by side surfaces or walls of the tread elements, and are interrupted between adjacent surfaces of the individual tread elements. Thus, along one upper side of the selected ones of said grooves, those tread elements defining a side of the selected grooves are formed with serrations. Those serrations extend inward of the groove from the tread surface, at an acute angle to one or more radial planes bisecting the center or rotational axis of the tire, in the case of peripheral grooves, or to transverse radial planes through the tire. The serrations are terminated short of the base of the associated grooves.

Thus if the tread elements with serrations are only on one side of a groove, the groove is generally in the shape of half a Y-shape, and if the serrations are on tread elements along both sides of the groove, e.g. opposing parts of tread elements, the groove is generally Y-shape.

The serrations are formed along at least a major portion of the selected tread elements which define groove side walls. The serrated surfaces present a substantially increased traction area along the outer or open top of the groove, and define the groove as an opening of increased area at the top within the upper part of the groove. Stated another way, the serrated portions of the tread elements will form extensions of the tread surface that occupy a fraction of the tread width which is less than the actual width of the serrated surface, thereby providing additional traction or tread surface in excess of the overall width of the tread.

Thus, in various species of the novel tread the serrations may be on tread elements along one side of one or more of a plurality of peripheral tread grooves or transverse tread grooves, and may be along opposite sides of one or more of the selected tread grooves. By way of example, the serrations may be formed on one or both sides of selected ones of the sides of selected tread elements forming transverse grooves, typically at 90° spacings about the tread perimeter. Alternatively (or additionally), the serrations may be formed along a substantial number (or all) of the tread elements defining peripheral grooves, particularly the two outermost peripheral grooves of a tread having three or more such peripheral grooves.

Other objects and advantages of the invention will be apparent from the following full description, the accompanying drawings and the appended claims.

BRIEF DESCRIPTION OF THE DRAWINGS

FIG. 4 is a partial plan view of the edges of serrations at the tread surface of a tread block;

FIG. 5 is a view similar to FIG. 2, illustrating the formation of serrations on adjacent tread blocks at just one side of an annular groove;

FIG. 6 is a view similar to FIG. 2, illustrating the formation of serrations on a transverse side or sides of a tread block.

DESCRIPTION OF PREFERRED EMBODIMENTS

Figure 1:
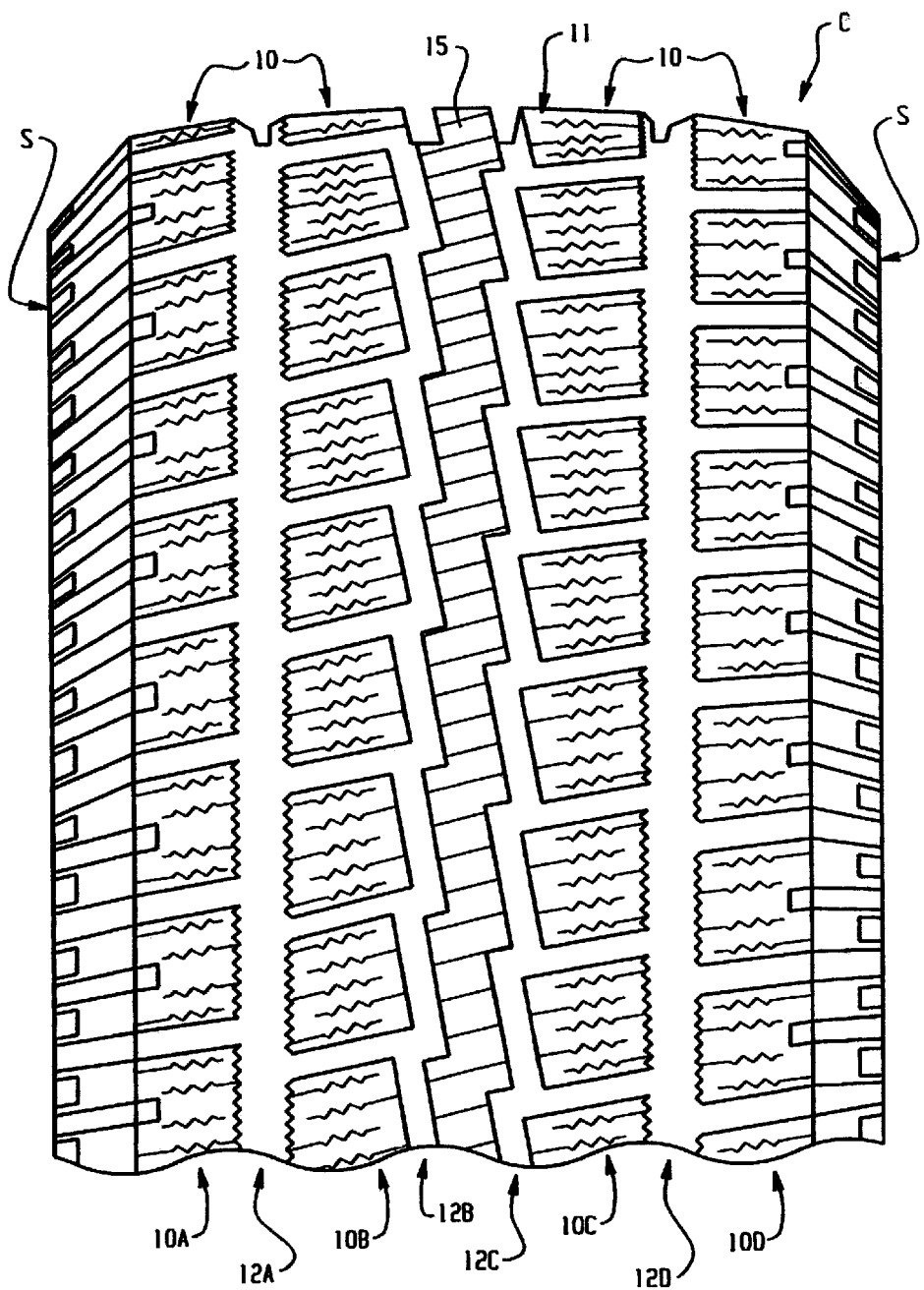
FIG. 1 is a perspective view of a segment of a tire including a carcass with side walls and a peripherally surrounding relatively thick elastomeric tread incorporating the invention, the tread having four annular grooves (in the embodiment shown) defined by separated tread block elements which define a central tread element between the two center-most grooves, and having serrations on the sides of the tread elements defining the two outer circular grooves.

Referring to FIG. 1, a tire carcass C having sidewalls S and incorporating the improved elastomeric tire tread of the invention has an tread surface 11 defined by separated tread elements which are somewhat irregular blocks 10 formed in the tread and which define a tread pattern comprising a plurality of circumferential rows of such blocks. Typically the blocks 10 will be of generally square or polygonal shape projecting outward from the base of the tread, and have side walls and a top surface which is part of the tread surface 11, as shown in FIG. 1. The blocks in rows 10A and 10B and in rows 10C and 10D, respectively, are similar to each other in size and shape, and define between them, around the circumference of the tire tread, two outer peripheral grooves 12A and 12D. These two grooves are essentially linear about the tread, and are identified hereinafter as the "straight" grooves.

A central tread element 15, which has a repetitive zig-zag shape about the tread surface 11, lies between the blocks in rows 10B and 10C, and defines with those blocks central grooves 12B and 12C which have a continuous zig-zag shape generally corresponding to the central tread element 15. It will be apparent from FIG. 1 that the configuration of tread blocks in rows 10A and 10D (at the outer sides of the tread) are essentially mirror images of each other, and likewise the tread blocks in rows 10B and 10c are essentially mirror images of each other.

Figure 2:
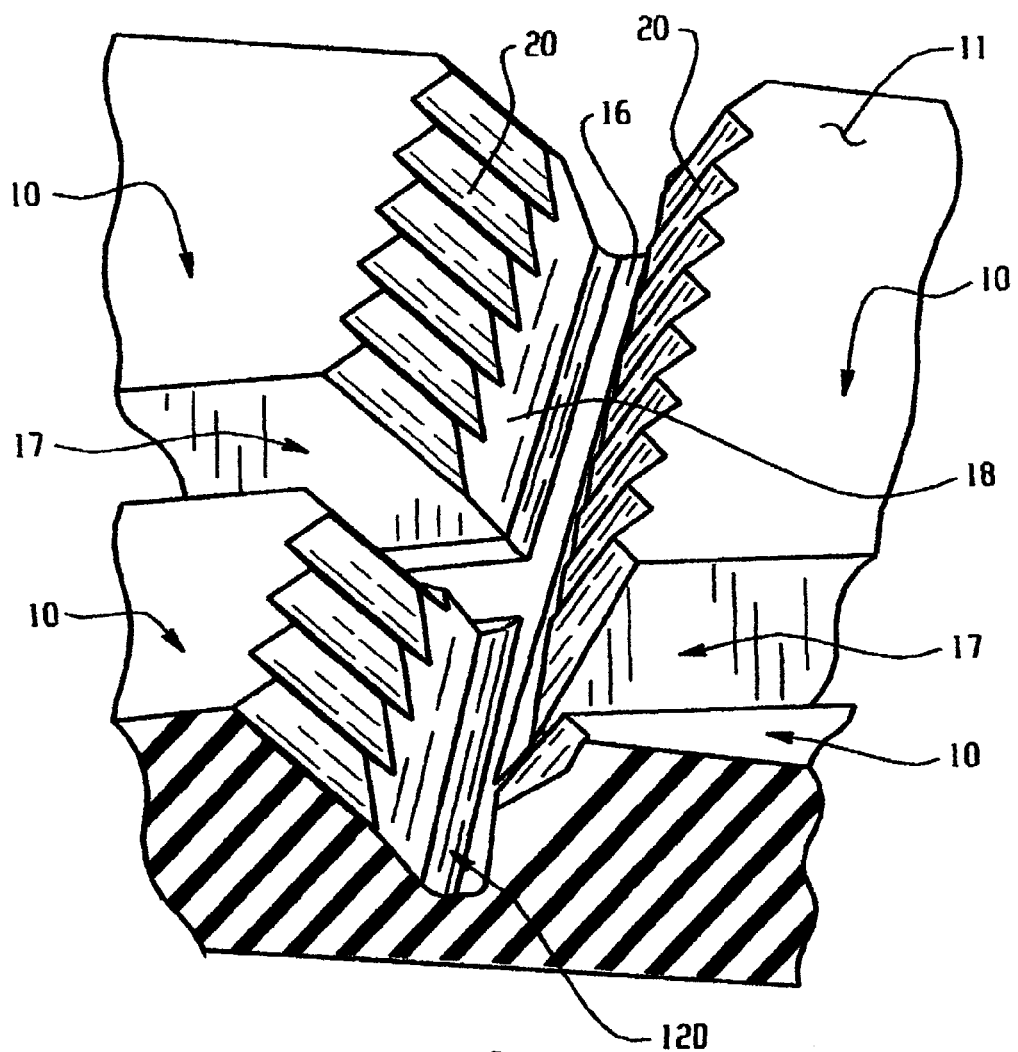
FIG. 2 is an enlarged partial perspective view showing the relative size and disposition of serrations formed in the groove sides of tread blocks on opposed or facing sides of the peripheral circular groove at the right of FIG. 1.

In accordance with the invention, the tread blocks along at least one side (the straight side) of one of grooves 12A or 12D are formed with serrations 20 (FIG. 2). All, or at least a major portion of their surface(s) facing the groove, are constructed with these serrations. In the tread illustrated in FIG. 1, it will be noted that both sides of the two outer grooves 12A and 12D include such serrations.

Figure 3:
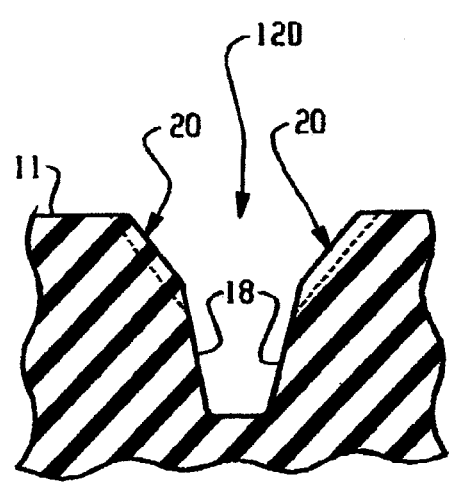
FIG. 3 is a cross-sectional view taken across FIG. 2.

Referring to FIG. 2, which shows a segment of groove 12D, serrations 20 extend from the tread surface 11 inward of the groove at an acute angle (for example about beginning at line 4 of page 6 to 30°–45°) to a radial plane through the center of the groove(s). The serrations are located such that they terminate short of the groove base bottom 16. The intersection of the serrated tread element surfaces with the groove base sides 18 is at about 60% of the groove depth, as seen in FIG. 3. The section of groove 12D is illustrated in FIG. 2, together with the cross-sectional view FIG. 3, illustrates the shape of the groove, with the side of the groove closer to the tire sidewall (to the right in FIGS. 2 & 3) being at a slightly larger angle than the side closer to the tire center plane. This configuration is reversed in groove 12A such that the side of groove 12A closer to the adjacent sidewall is formed at the larger angle.

Serrations 20 can be formed on at least a major portion of the sides 18 of those tread element blocks bounding rows 12A and 12D. In FIG. 1 both sides of grooves 12A and 12D have serrations on all such blocks. The sides of those grooves are discontinuous, in that spaces or transverse grooves 17 exist between adjacent tread blocks, thus it can be seen that the serrated tread elements on opposite sides of grooves 12A and 12D each form a series of separate side surface elements of those grooves.

In fact, in this embodiment, the block-like tread elements 10 are offset circumferentially about the tread, and their spacing provides discontinuous side walls of the groove(s) by the positioning of the side elements 18.

In the tread configuration illustrated in FIG. 1, the serrated side elements 18 are formed on the groove sides of each of the opposing tread blocks defining opposite sides of grooves 12A and 12D, such that the groove is generally Y-shape in cross-section. Optionally, these serrated tread block surfaces can be provided only on one side of the tread blocks 10 defining one or both of grooves 12A and 12D as being one half Y-shape.

Referring to FIG. 4, and noting the upper edges of the series of serrations 20, it will be apparent that such formation substantially increases the effective area of the groove-defining block walls. Such expanded surfaces, because of their angular relation to the tread surface itself, provide on the outward opening regions of the groove or grooves (see FIG. 2) a much larger contact area between the tire tread and compressible (but somewhat fluid) roadway surfaces such as snow, broken ice, or mud.

FIG. 5 illustrates the application of the invention to only one side of a tread groove. In some instances, this will provide an adequate enhancement in traction and control to a vehicle on which these tires are fitted. Since the parts are the same, the same reference numerals are employed.

FIG. 6 shows the application of the special serrations of the invention to transverse side(s) of a tread element or block. In this embodiment selected ones of either or both of the transverse side surfaces 21 and 22 of selected ones of the tread blocks are provided with the serrations. Similar to the peripheral grooves as discussed above, the transverse grooves between tread blocks will be Y-shape or one half Y-shape, depending upon the configuration of the opposing side surface of adjacent tread block(s). According to the broader aspects of the invention selected ones of the tread blocks defining the peripheral grooves and/or the transverse grooves can be provided with the serration configuration disclosed herein.

Figure 7:
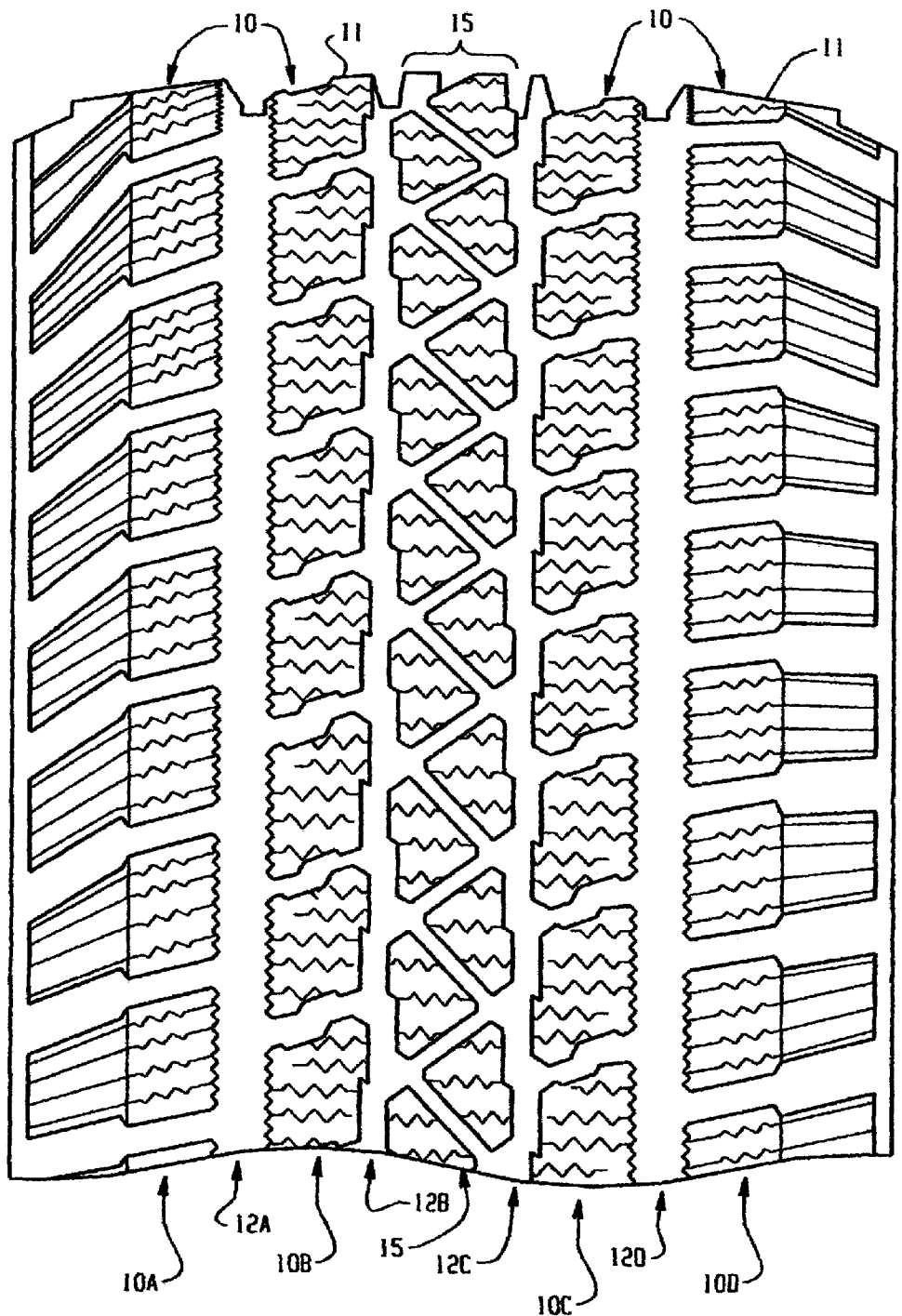
FIG. 7 is a segmental plan view of another species of tire tread having four annular grooves, a discontinuous central tread element comprised of opposed generally triangular tread blocks, and having serrations on the opposing groove sides of those tread elements defining the two outer circular grooves.

FIG. 7 shows an alternate tread configuration embodying the invention. Here the interior tread blocks in rows 10B, 10C, and 10D define the central irregular grooves 12B and 12C, and the tread blocks in row 10C are of alternating generally triangular shape. The serrations are formed on the walls (facing grooves 12A and 12D) of blocks in rows 10A, 10B, and 10D, 10E. Since the individual elements are the same, as far as the invention is concerned, the same references numerals as used as in FIGS. 1–3. Likewise FIGS. 2–4 apply also as to FIG. 7.

Dimensions shown on the drawings are for illustrative purposes and are not to be considered as critical. While the forms of treads and tread elements herein described constitute preferred embodiments of this invention, it is to be understood that the invention is not limited to these precise forms, and that changes may be made therein without departing from the scope of the invention which is defined in the appended claims.

What is claimed is:

1. A tread portion for a motor vehicle tire having a carcass including side walls, said tire carcass extending between the side walls, said tread portion having a tread surface and a plurality of peripheral grooves formed therein extending partially into said tread portion, said grooves having sides, a bottom, and an open top within said tread portion, selected ones of said groove sides having an upper section sloping inward at an angle in the order of 30° to 45° with respect to a radial plane and terminating at an upper edge of a lower section above said bottom of said groove at about 60% of the groove depth to form an upper and wider part of said groove which diminishes in width radially inward toward said bottom of said groove, at least one of said sloping upper sections of said selected groove sides having serrations formed thereon over its entire surfaces to present a traction surface of expanded area extending around the majority of the tread within the upper part of the groove, wherein the side of the lower section of the groove is inclined with respect to the radial plane at an angle smaller than the angle at which the upper section slopes.

2. A tread portion for a motor vehicle tire having a carcass and attached side walls, said tread portion-having opposite sides and including
- a plurality of block-shaped tread elements arranged in a series of rows around the tread portion, the tread elements having an outer surface and a plurality of side surfaces and being spaced apart circumferentially and transversely about the tire tread portion to form a tread thereon,
- selected ones of said tread elements defining between them a plurality of peripheral grooves extending around and forming the outer surface of said tread portion,
- each groove having a bottom portion comprising a groove base and groove sides extending from the outer surface of said tread portion into said tread to the groove base within the tread portion,
- the tread elements on opposite sides of a respective groove above said bottom portion including separate upper side surface portions on one side of said groove extending upward and away from an upper edge of the groove bottom portion to said tread surface,
- a majority of said selected upper side surface portions having a set of serrations thereon extending inward of said outer surface and terminating at their junction with the upper edge of said bottom portion of the groove,
- said set of serrations covering the selected upper side portions and extending inward of the outer surface to the junction of said serrations with the bottom portion of the groove presenting a first traction surface of substantially greater surface area than presented by a comparable but non-serrated upper side surface portion of said tread elements,
- said traction surface sloping inward of the outer surface at an angle in the order of 30° to 45° with respect to a radial plane and intersecting the side of said bottom portion of the groove above said base of said groove at about 60% of the total groove depth to form a wider upper part of said groove, whereby the width of the groove diminishes in width radially inward toward, and short of, said base of said groove and the traction surface is predominantly within the upper part of the groove wherein the side of said bottom portion is inclined with respect to the radial plane at an angle smaller than the angle at which the traction surface slopes.

3. A tread portion as defined in claim 2, wherein said traction surfaces are formed on the tread element upper side surface portion which define at least one wall of axially outermost peripheral grooves which are closest to said sides of said tread portion.

4. A tread portion as defined in claim 3, wherein serrations are formed on the upper side surface portions of both walls of the axially outermost peripheral grooves.

5. A tread portion as defined in either of claim 3 or 4, wherein additional peripheral inner grooves are formed between axially outermost peripheral grooves.

6. A tread portion as defined in claim 3 or 4, wherein said serrations are also formed on at least one wall of transverse grooves in the tread.

7. A tread portion as defined in claim 6, wherein said serrations are formed on at least one wall of each transverse groove of selected groups of transverse grooves in the tread.

8. A motor vehicle tire having a carcass including side walls and a tread portion on the periphery of said tire carcass extending between the side walls, said tread portion comprising a relatively thick layer of elastomeric material having an outer surface and a pattern of relieved areas in said layer defining a plurality of block-shaped spaced apart tread elements to form a tread surface which will be in rolling contact with roadway surfaces,
- said tread elements being arranged in rows extending circumferentially about the tire tread portion,
- selected tread elements defining between them a plurality of peripheral and transverse grooves in the tread, each groove having a bottom portion comprising a groove base and groove sides extending upward from the groove base at an acute angle for about 40% of the groove depth, whereby the tread elements on opposite sides of a respective groove form discontinuous separate upper side walls of said groove,
- the upper portions of said selected tread elements having serrations extending inward and downward at an angle to said tread surface, said serrations presenting a traction surface sloping inward from the tread at an angle in the order of 30° to 45° with respect to a radial plane and terminating above the bottom of said groove at about 60% of the groove depth to form an upper part of said groove, whereby the groove diminishes in width radially inward toward said bottom of said groove wherein the side of said bottom portion is inclined with respect to the radial plane at an angle smaller than the angle at which the traction surface slopes.

9. A tire as defined in claim 8, wherein said serrations are formed on at least one wall of grooves which are closest to said side walls of said carcass.

10. A tire as defined in claim 8, wherein said serrations are formed on both walls of grooves which are closest to said side walls of said carcass.

11. A tire as defined in claim 10, wherein opposed ones of said serrated upper wall portions of said grooves extend at different angles from each other and within 30° to 45° with respect to said radial plane.

* * * * *